May 2, 1967  A. R. THOMPSON  3,317,915
MAGNETIC RECORDER WITH LINEARITY COMPENSATION
Filed Nov. 12, 1964                      2 Sheets-Sheet 1

INVENTOR.
ALLAN R. THOMPSON
BY
Elver J. Hyde
ATTORNEY

May 2, 1967 A. R. THOMPSON 3,317,915
MAGNETIC RECORDER WITH LINEARITY COMPENSATION
Filed Nov. 12, 1964 2 Sheets-Sheet 2
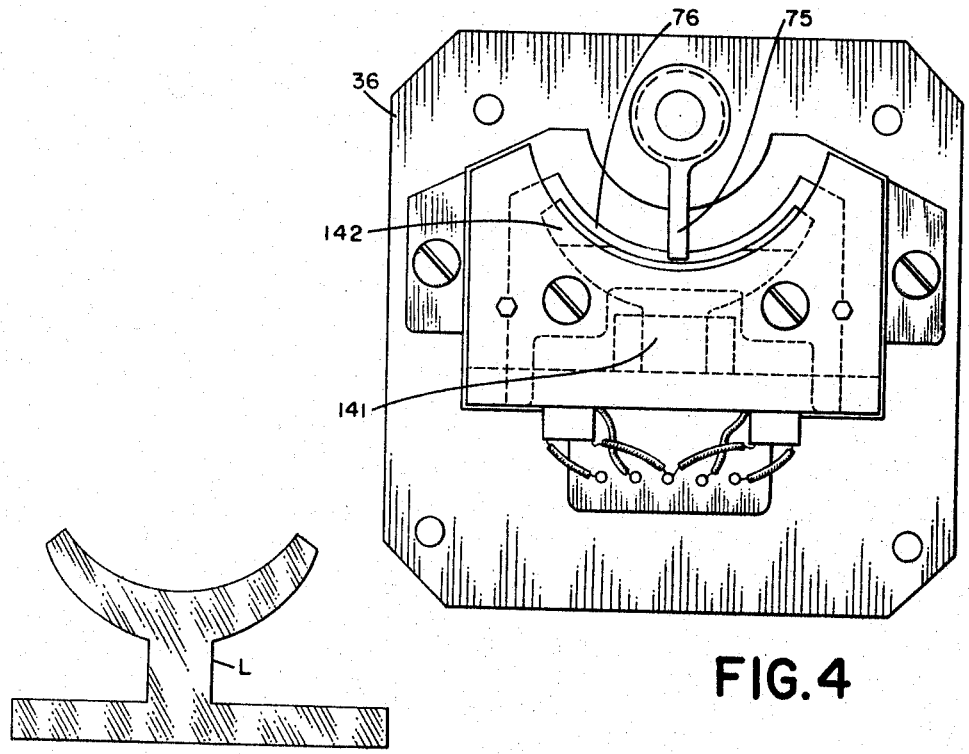
FIG.4
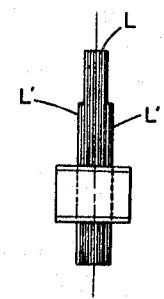
FIG.7
FIG.6
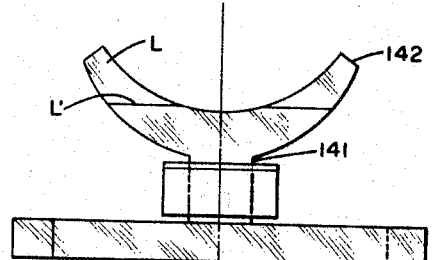
FIG.5
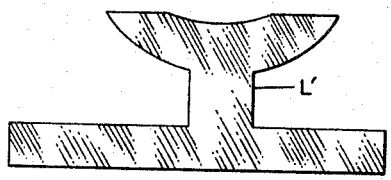
FIG.8
INVENTOR.
ALLAN R. THOMPSON
BY
*Eber J. Hyde*
ATTORNEY

United States Patent Office 3,317,915
Patented May 2, 1967

3,317,915
MAGNETIC RECORDER WITH LINEARITY COMPENSATION
Allan R. Thompson, Westlake, Ohio, assignor to Clevite Corporation, a corporation of Ohio
Filed Nov. 12, 1964, Ser. No. 410,562
3 Claims. (Cl. 346—117)

This invention pertains to a magnetic recorder device such as a pen or stylus recorder for recording electric signals. More particularly the invention pertains to such a recording device wherein rotary motion of a driving coil in the air gap of a magnet is converted to a rectilinear motion of the tip of the pen or stylus.

The rotary-to-rectilinear linkage is reasonably linear for instruments wherein the recording tip does not go through a wide excursion, and the error introduced by the non-linearity is not serious. However, if the recording tip is to go through a wide excursion, the error introduced is of a magnitude which is undesirable for an accurate recorder.

It is an object of the present invention to provide a recording device, particularly for wide excursion rectilinear recording, wherein error introduced by a non-linear rotary-to-rectilinear linkage system is compensated by a stabilized servo loop or feedback system which introduces a non-linear function which substantially compensates for the linkage non-linearity.

For a better understanding of the present invention, together with other and further objects thereof, reference may be made to the following description taken in connection with the accompanying drawings, and its scope will be pointed out in the appended claims.

Figure 3:
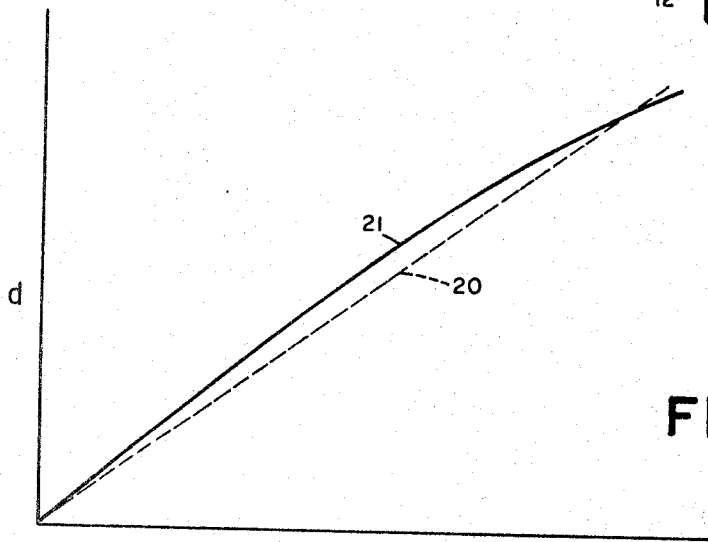

FIGURE 3 is a graph showing the deviation from linear introduced by the rotary-to-rectilinear linkage, FIGURE 4 is a plan view of the position-sensing transducer which introduces a function to compensate for the deviation shown in FIGURE 3, FIGURE 5 is a plan view of a portion of the position-sensing transducer shown in FIGURE 4, FIGURE 6 is a side view of the portion shown in FIGURE 5, and FIGURES 7 and 8 show plan views of laminations which make up the portion shown in FIGURES 5 and 6.

An aspect of the present invention lies in the provision of a recording device having a recording tip such as a pen or stylus for recording on a moving record chart, and wherein the recording tip is driven by a coil which is rotatable in the air gap of a magnet system. A rotary-to-rectilinear linkage is located between the coil and the recording device to convert the rotary motion of the coil into a rectilinear motion of the recording tip across the record chart, and this linkage, unfortunately, introduces a non-linear function into the system so that the transverse position of the writing tip on the record chart is a non-linear function of the rotary position of the coil. Electric circuit means including a signal input means and a differential error amplifier are connected to the driving coil. A position-sensing transducer means is connected to the driving coil to sense the position of the recording tip as it moves across the record chart and it is electrically connected to the electric circuit means to apply thereto an electric signal proportional to the position of the recording tip, thereby to correct for the non-linearity of the linkage mechanism.

Figure 1:
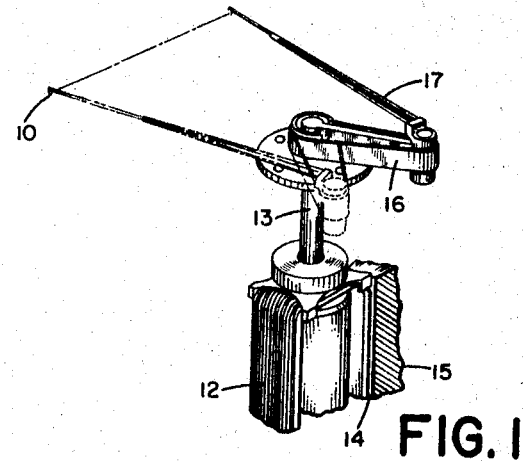
FIGURE 1 is an isometric view of a rotary-to-rectilinear linkage in a magnetic recorder device.
Figure 2:
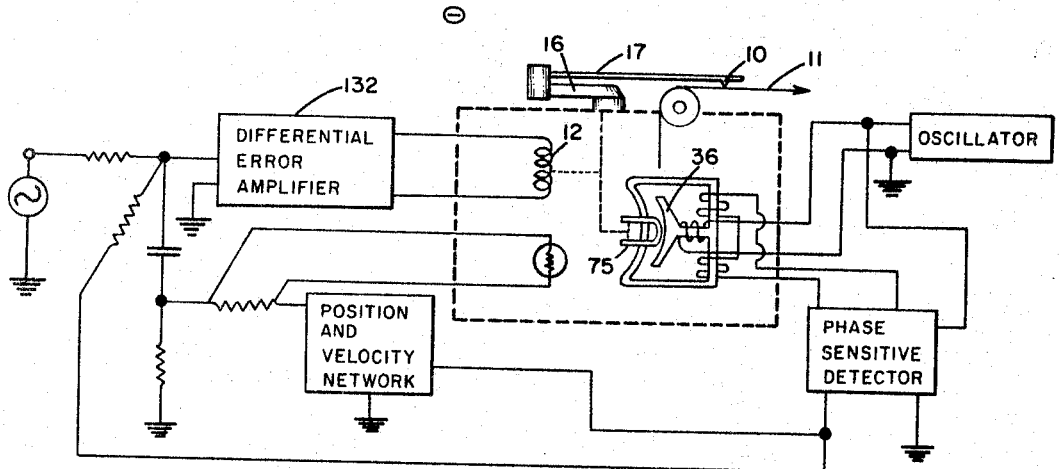
FIGURE 2 is a schematic circuit diagram of the recorder device.

With reference to FIGURES 1 and 2 there is shown a recorder device, for example a pen recorder, wherein a pen tip 10 is caused to move rectilinearly across a moving record chart 11. The pen tip 10 is driven by a coil 12 which is connected to shaft 13 mounted by means not shown in the air gap 14 of a magnet system 15. A linkage 16 converts the rotary motion of the coil 12 and shaft 13 into rectilinear motion of the tip 10 of the pen 17. Details of the linkage 16 and of the coil mounting and magnet system form no part of this invention, and are to be found in Patent No. 3,088,788, issued to Arling Dix Brown and Chester L. Morris on May 7, 1963, for a Magnetic Pen Recorder Mechanism, and assigned to the same assignee as the present invention. FIGURE 13 of the patent shows a feedback circuit for driving the coil, including means for stabilizing or damping the system, and including a position-sensitive transducer device. An improved feedback circuit is shown, described and claimed in an application recently filed in the names of William E. Koeblitz and Allan R. Thompson for a Magnetic Recorder Device, Ser. No. 409,699. Reference should be made to that application for a detailed description of the circuit shown herein as FIGURE 2. In the early patent the coil shaft rotated about 15° to either side of center, and a non-linear function introduced by the rotary-to-rectilinear linkage could be tolerated because it was quite small. In the present system the coil shaft can be rotated about 35° to either side of center, thereby introducing a much larger non-linear function which cannot be tolerated in a precision instrument. The present invention corrects for these non-linear functions and brings the system back within the range of non-linearity which can be tolerated.

The linkage 16 shown in FIGURE 1 converts the rotary motion of the coil 12 into a linear motion of the pen tip 10 across the record chart 11. It would be desirable to have a linear relationship between the rotary motion of the coil 12 and the deflection of the pen tip 10; that is, for each incremental angle through which coil 12 rotates we want the pen tip to move a given amount. For pen tip excursions up to about 40 mm. the error introduced by the non-linear characteristic of the linkage 16 is quite small and can be disregarded in a precision recording device. However, for wider excursions the error becomes larger, and for a coil rotation to one side of about 35° introduces an error of about 1.4% at 20°. This is more error than is desired in a precision recorder.

FIGURE 3 is a graph showing the position of the pen tip on the chart $d$ versus the angular position of the drive coil $\theta$. The dotted straight line 20 shows the desired linear relationship, and the solid line 21 shows the actual non-linear relationship, and is expressed by the equation:

$$d = a \sin \theta + b \sin K\theta$$

The vertical distance between the two lines is the error due to linkage non-linearity at any given $\theta$, wherein $a$ is the length of the link 16 between the centers of the two shafts 13 and the shaft for pen 17, and $b$ is the length of the pen 17 from its shaft to its tip. A more detailed description of the derivation of the equation will be found in columns 5 and 6 of Patent 3,088,788, assigned to the same assignee as the present invention.

The position-sensitive transducer such as was shown and described in FIGURES 14 and 15 of Patent 3,088,788 had a linear electric output versus angular position of the flux barrier, and the flux barrier was driven by the rotatable coil. Consequently, for wide pen tip excursion an uncorrected non-linear relationship existed.

The position-sensing transducer 36 shown in FIGURES 4 to 8 introduces into the system shown in FIGURE 2 a non-linear electrical output whose magnitude at any given angle $\theta$ is substantially the same as the error shown in FIGURE 3 for that angle $\theta$, and which is in the same direction as the error shown in FIGURE 3. In other words, the output of the transducer 36 versus θ is non-linear by about the same amount and in the same direction as that of the recorder tip deflection versus θ. The transducer output is fed back into the differential error amplifier 132 to drive coil 12, as has been described in the Koeblitz-Thompson application, and results in the tip 10 of the recorder 17 having a linear relationship to the magnitude of the input signal to a maximum deviation of about .2%.

The transducer 36 produces the non-linear electrical output because of a change in the laminations which make up the arcuate enlargement 142 of the center leg 141. In the prior art transducers the center leg 141 was made up of a plurality of identical laminations of the type shown in FIGURE 7.

The transducer 36 of the present system uses fifteen laminations L as shown in FIGURE 7, and five laminations L' which are identical to laminations L but with their extremities removed. Preferably, as shown in FIGURE 6, three laminations L' are on one face of the stack and two laminations L' are on the other face of the stack. The movable flux barrier 75 is driven by coil 12 and moves in the air gap 76. It generates an electric output which is non-linear due to the clipped laminations.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A recorder for writing on a record chart, comprising, in combination: a magnet system having an air gap; a driving coil rotatable in said air gap; a recording device having a recording tip for writing on said record chart and driven by said driving coil; a non-linear rotary-to-rectilinear linkage mechanism connected between said coil and said recording device to convert the rotary motion of said coil to a rectilinear motion of said writing tip, the transverse position of the said writing tip on said record chart being a predetermined non-linear function of the rotary position of said coil; electric circuit means including signal input means and a differential error amplifier connected to said driving coil; and position-sensing non-linear transducer means connected to said driving coil to sense the angular position of said coil as it rotates and electrically connected to the electric circuit means to apply thereto an electric signal proportional to the given angular position of said coil corrected for the error due to said predetermined linkage non-linearity for said given angular position thereby to correct for the said non-linearity of said linkage mechanism.

2. A recording device as set forth in claim 1, further characterized by said position-sensing means generating an electric signal which has a non-linear function by substantially the same amount and in the same direction as the said non-linear function between the transverse position of the writing tip and the rotary position of said driving coil.

3. A recording device as set forth in claim 2, further characterized by said position-sensing means comprising a position-sensitive transducer formed of a plurality of ferro-magnetic laminations arranged to form first and second magnetic circuits having a common portion and an air-gap forming a series portion of one of said magnetic circuits, means for inducing alternating flux in said common portion, a movably mounted flux barrier of non-magnetic material positioned to extend into said air gap, said flux barrier comprising a closed loop of electrically conductive material, means connecting said flux barrier to said driving coil whereby rotary movement of said coil moves said flux barrier thereby to vary the relative division of flux between said first and second magnetic circuits as a measure of the displacement of said flux barrier from a predetermined position, second and third windings connected in series opposition and coupled respectively to said first and second magnetic circuits, the electrical output from said second and third windings being connected to said differential error amplifier, at least a portion of said laminations being shaped in relation to the path of movement of said flux barrier so that the said electrical output is a non-linear function of the location of said flux barrier from said predetermined position.

References Cited by the Examiner

UNITED STATES PATENTS

| | | | |
|---|---|---|---|
| 2,350,835 | 6/1944 | Sias | 317—173 |
| 2,718,614 | 9/1955 | Gamble | 317—171 |
| 2,978,639 | 4/1961 | Lawson | 317—171 |
| 3,088,788 | 5/1963 | Brown et al. | 346—117 |
| 3,144,603 | 8/1964 | Petzinger | 317—166 |

RICHARD B. WILKINSON, *Primary Examiner.*

J. G. MURRAY, H. B. KATZ, *Assistant Examiners.*